No. 771,252.

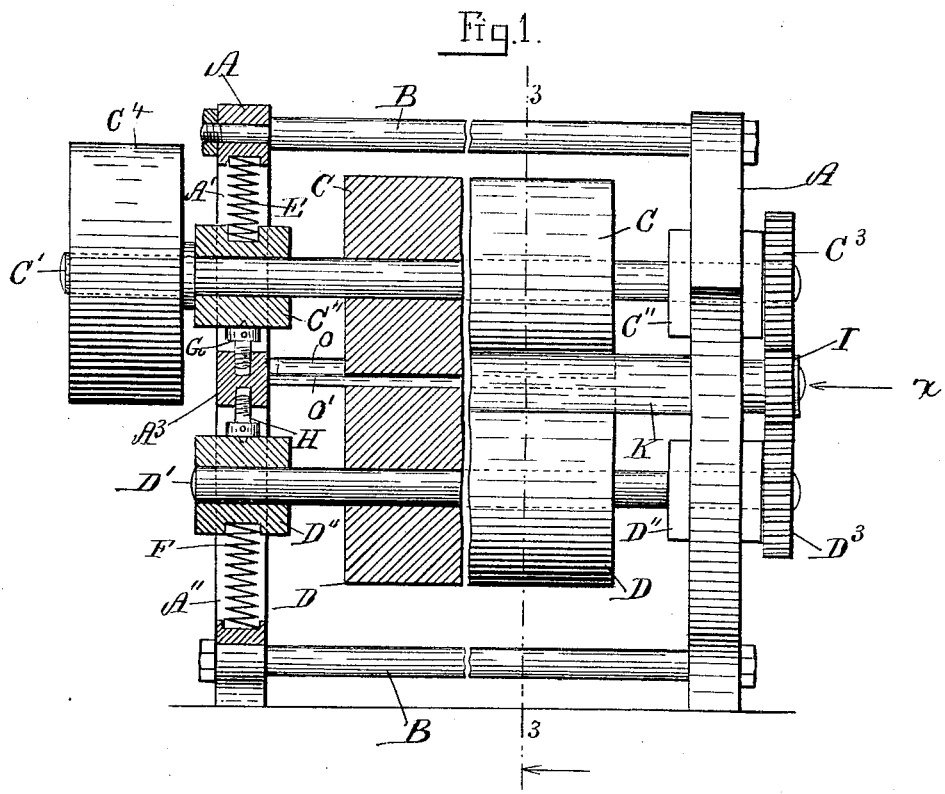

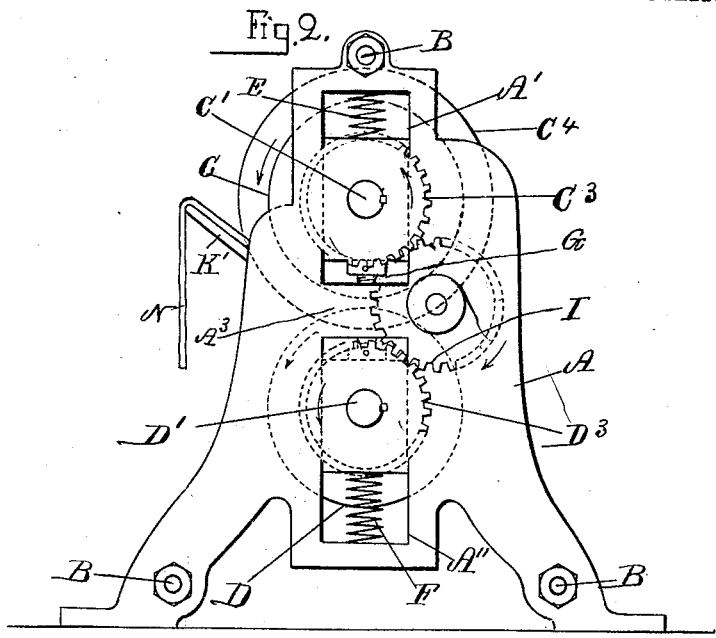
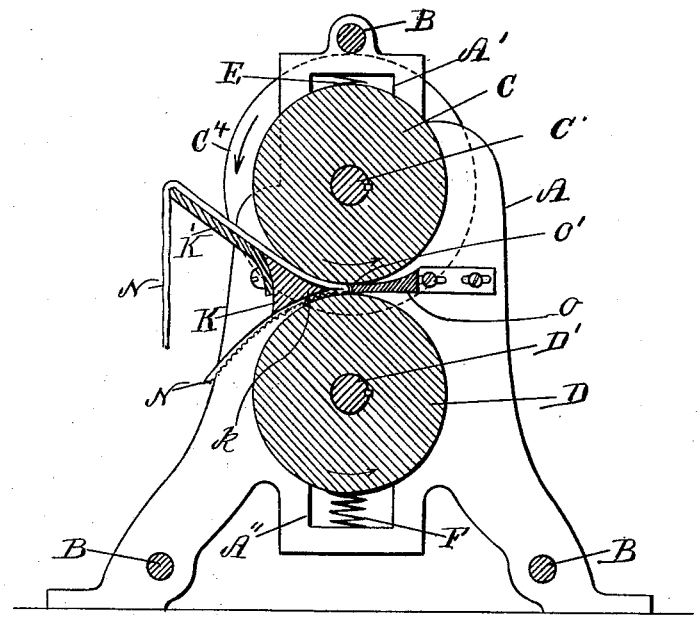

Patented October 4, 1904.

UNITED STATES PATENT OFFICE.

CHARLES H. KEEFE, OF SALEM, MASSACHUSETTS.

LEATHER-GRAINING MACHINE.

SPECIFICATION forming part of Letters Patent No. 771,252, dated October 4, 1904.

Application filed January 16, 1904. Serial No. 189,245. (No model.)

*To all whom it may concern:*

Be it known that I, CHARLES H. KEEFE, a citizen of the United States, and a resident of Salem, in the county of Essex and State of Massachusetts, have invented certain new and useful Improvements in Leather-Graining Machines, of which the following is a specification.

This invention relates to improvements in machines for graining leather—such as, for instance, box-calf, bag-leather, enameled leather, shoe-upper leather, &c.—and it is carried out as follows, reference being had to the accompanying drawings, wherein—

Figure 1 is a front elevation of the improved machine, partly shown in section. Fig. 2 is an end view as seen from X in Fig. 1, and Fig. 3 is a cross-section on the line 3 3 shown in Fig. 1.

Similar letters refer to similar parts wherever they occur on the different parts of the drawings.

In the drawings, A A represent the end frames, which are secured at a proper distance apart by means of stays or braces B B, as shown.

C and D are cylindrical graining-rollers, preferably made of metal and secured to the respective shafts $C'$ $D'$, as shown. Said rollers may be made smooth or corrugated, as may be desired, without departing from the essence of my invention. The ends of the shaft $C'$ are journaled, preferably, in vertically-adjustable bearings $C''$ $C''$, arranged in slotted guides $A'$ $A'$ in the frames A A, the upper ends of which are closed, as shown. In a similar manner the ends of the shaft D are journaled in vertically-adjustable bearings $D''$ $D''$, arranged in slotted guides $A''$ $A''$ in the frames A A, as shown.

In practice I interpose yielding springs E E between the bearings $C''$ $C''$ and the upper ends of the frames A A, and in a similar manner I interpose yielding springs F F between the bearings $D''$ $D''$ and the lower slots $A''$ $A''$ for the purpose of holding the graining-rollers C D in contact with the leather N during the graining operation and allowing said rollers to yield according to inequalities in the thickness of the leather that is being grained.

$A^3$ is a division in each frame A between the respective guides $A'$ and $A''$, as shown.

For the purpose of preventing the graining-rollers C D from contacting I arrange between the bearings $C''$ $D''$ and the division-bar $A^3$ regulating-screws G H, as shown in Fig. 1, by the adjustment of which the graining-rollers C D may be limited in movement toward each other according to the thickness of the leather that is to be grained. I have shown in the drawings both rollers C and D as being vertically adjustable; but this is not essential, as only one, preferably the lower one, may be so adjustable without departing from the spirit of my invention.

To the ends of the shafts C D are secured the respective spur-gears $C^3$ $D^3$, the teeth of which intermesh with a loosely-rotating intermediate gear I, by which arrangement the rollers C D are caused to rotate in the same direction when rotary motion is applied to one of them during the graining operation. In practice the graining-rollers may be set in rotary motion by any well-known mechanism. For illustration I have shown a belt-pulley $C^4$ secured to the end of the shaft $C'$, to which a rotary motion may be imparted by belt-power or otherwise, as may be desirable.

In front of the rollers C D is located a longitudinal graining-bar K, having its rear edge $k$ located at or near the junction of the periphery of the rollers C D, as shown. In practice I prefer to attach to the front of said bar K or made integral therewith a work-supporting table $K'$, as shown, upon which the leather N is guided while being grained.

Back of the rollers C D is located a folder-bar O, secured in a suitable manner to and between the frames A A. The inner edge $O'$ of said folder-bar extends between the rollers C D opposite to the rear edge of the bar K and approximately in close proximity thereto, as shown in Fig. 3. In practice said folder-bar may be adjustable to and from the rear edge of the bar K, according to the thickness of the leather that is being grained. The inner edge O' of the folder-bar O is shown as being concave in section; but this is not essential, as it may be of any other sectional shape as may be desired without departing from the essence of my invention.

In using the machine the pulley C⁴ is set in a rotary motion, causing the rollers C D to rotate in the same direction as shown by arrows in Fig. 1. The leather N is then introduced, with the flesh side uppermost, between the upper side of the graining-bar K and the upper rotary roller C, causing the forward end of the leather to be fed against the inner edge O' of the folder-bar O, and thereby folded over the edge k on the bar K and carried forward by the lower rotary roller D and discharged, as shown in Fig. 3, causing the leather to be grained as it passes between said rollers and around the edge k of the graining-bar K, as above described.

The machine is very simple in construction, composed of very few parts, and by its means skins or side-leather may be quickly grained as compared with the usual hand method for this purpose.

Having thus fully described the nature, construction, and operation of my invention, I wish to secure by Letters Patent and claim—

1. A leather-graining machine, consisting of a pair of rotary graining-rollers, in combination with a bar arranged in front of and intermediate said rollers and a folder-bar arranged at the rear of the latter substantially as and for the purpose set forth.

2. A leather-graining machine, consisting of a pair of rotary rollers, one or both of which are yielding and adjustable to and from each other in combination with a graining-bar arranged in front of and intermediate said rollers, and a folder-bar arranged at the rear of and intermediate the latter, substantially as and for the purpose set forth.

3. A leather-graining machine, consisting of a pair of rotary rollers, combined with a graining-bar arranged in front of and intermediate said rollers and an adjustable folder-bar arranged at the rear of and intermediate the latter, substantially as and for the purpose set forth.

In testimony whereof I have affixed my signature in presence of two witnesses.

CHARLES H. KEEFE.

Witnesses:
ALBAN ANDRÉN,
SAMUEL P. WHITE.